United States Patent [19]

Mlikotin

[11] 4,349,928

[45] Sep. 21, 1982

[54] MULTI-PURPOSE PLUMBING TOOL

[76] Inventor: Alexander T. Mlikotin, P.O. Box 1975, Santa Monica, Calif. 90406

[21] Appl. No.: 211,433

[22] Filed: Nov. 28, 1980

[51] Int. Cl.³ .............................................. B25F 1/00
[52] U.S. Cl. ........................................ 7/157; 30/92; 30/378
[58] Field of Search .................. 7/156, 157, 158, 163; 30/92, 93, 97, 166 R, 166 A, 371, 378

[56] References Cited

U.S. PATENT DOCUMENTS

| | | | |
|---|---|---|---|
| 2,195,568 | 4/1940 | Hexdall | 30/97 UX |
| 2,807,292 | 9/1957 | Gelinas | 7/163 X |
| 2,952,025 | 9/1960 | Johnson | 7/163 |
| 3,355,749 | 12/1967 | Steffen | 7/157 |
| 3,507,035 | 4/1970 | Mann, Jr. | 30/92 X |
| 3,805,383 | 4/1974 | McNally | 30/92 |
| 3,849,881 | 11/1974 | Strybel | 7/157 X |

*Primary Examiner*—James G. Smith
*Attorney, Agent, or Firm*—Ralph B. Pastoriza

[57] ABSTRACT

The multi-purpose plumbing tool is designed specifically for use with copper tubing to enable cutting and preparation of cut ends and associated fittings for soldering on a job site. Basically, the tool includes a frame supporting a motor driven high speed circular pipe saw. A handle and pipe vise structure in turn is pivoted as a unit to the frame in such a manner that a pipe gripped in the vise can be swung downwardly and forwardly into engagement with the circular saw blade and thereby cut. The same motor driving the saw blade is utilized to drive rotary wire brushes for cleaning the outside of cut ends of the pipe and the inside of fittings. Appropriate deburring and reaming operations are also performed by these rotating structures. Finally, flux applicator heads are provided to treat the cleaned pipe end surfaces and inside the fittings with appropriate flux paste preparatory to soldering, these flux applicator heads being held on the frame and supplied by paste from a cartridge carried in the frame.

9 Claims, 8 Drawing Figures

MULTI-PURPOSE PLUMBING TOOL

This invention relates generally to multi-purpose tools in a unitary structure and more particularly to a tool for use by plumbers in the cutting and assembly of copper piping or tubing at a job site.

BACKGROUND OF THE INVENTION

Conventional plumbing piping for hot and cold water in residential as well as certain industrial constructions can either be made of galvanized iron or copper. Galvanized iron pipes have been favored in the past because the material cost is substantially less than that of copper pipe. However, with the increase in labor costs, the industry has swung over to the use of all copper pipes almost exclusively since they can be more easily installed and assembled and in far less time than is the case with galvanized iron pipes. For example, in assembling galvanized iron piping, not only must the pipe be cut but the cut ends then threaded to effect desired connections. The entire operation is very time consuming. With copper piping, it is only necessary to cut the piping and then solder the ends which operation can be carried out far more rapidly. Accordingly, even though copper piping is more expensive, by using the same the savings in labor costs results in a net overall cost substantially less than that where galvanized piping is used.

From the foregoing, it is clear that any further means for saving labor time and thus costs would result in further reduction in the final construction costs for any one particular project.

BRIEF DESCRIPTION OF THE PRESENT INVENTION

With the foregoing considerations in mind, the present invention contemplates the provision of a multi-purpose plumbing tool particularly designed for cutting and preparing the cut ends of copper piping for soldering to appropriate fittings and the like in a plumbing construction job. While multi-purpose tools; that is, power tools which can perform a number of different functions, are known, there is none of which I am aware that will facilitate a plumber's cutting, soldering, and installation of copper plumbing pipe and fittings in a plumbing construction.

Briefly, the tool of this invention comprises an elongated portable frame incorporating a high speed motor. A circular pipe saw is coupled to the motor for high speed rotation about an axis running transverse to the elongated axis of the frame. A pipe vise, in turn, is provided for holding a pipe to be cut. Pivot means on the frame at a point spaced from the rotational axis of the saw are provided for enabling relative swinging movement to take place between the saw and pipe vise. The arrangement is such that a pipe can be held in the pipe vise and cut by swinging movement of the pivot means.

In the preferred embodiment of this invention, the pipe vise comprises two pairs of vise jaws, one on either side of the plane of the circular saw so that the pipe is held on either side of the cut and the possibility of loose pipe falling from the tool is avoided. In addition, appropriate means are incorporated in the frame and operated by the motor for cleaning, deburring and reaming the cut pipe ends and in addition means are provided in the frame in the form of flux or paste applicator heads for treating the cleaned pipe surfaces and inside surfaces of fittings with flux paste, preparatory to soldering.

BRIEF DESCRIPTION OF THE DRAWINGS

A better understanding of this invention will be had by now referring to the accompanying drawings in which.

DETAILED DESCRIPTION OF THE PREFERRED EMBODIMENT

Figure 1:
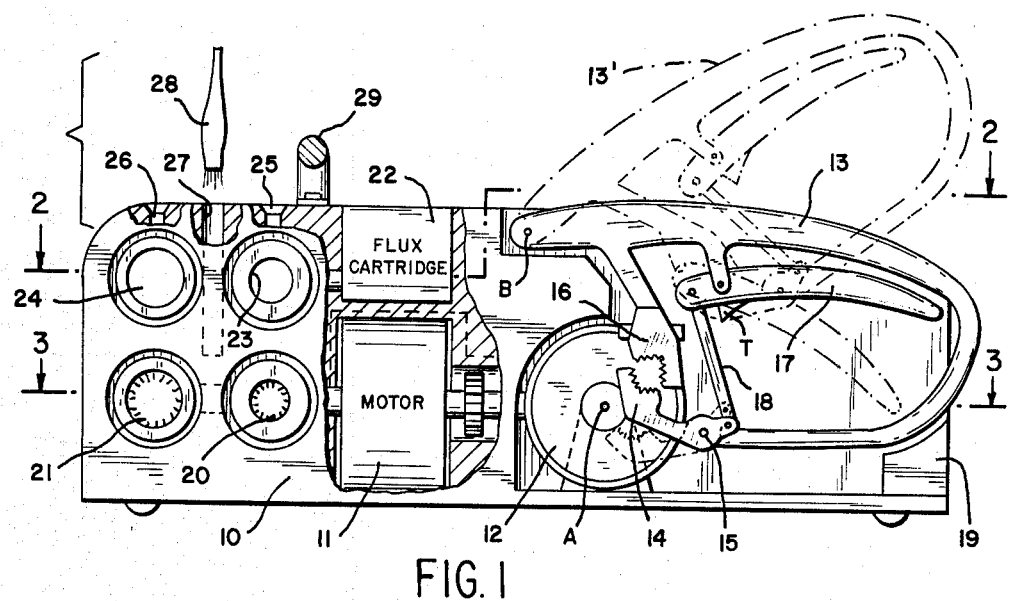
FIG. 1 is a side elevational view partly cut away and partly schematic in form of the multi-purpose plumbing tool of this invention.

Referring first to FIG. 1 the multi-purpose plumbing tool comprises an elongated frame 10. A high speed motor 11 is carried in the frame as indicated in the broken away portion. Motor 11 is coupled to a circular pipe saw 12 mounted for high speed rotation about a transverse axis A in an exposed position to the rear of the frame portion 10 housing the motor 11.

Saw blade 12 is designed to cut copper tubing or piping and in accord with a unique feature of the present invention, the copper pipe to be cut is brought into engagement with the circular saw blade 12 rather than moving the saw blade 12 into engagement with the pipe.

The foregoing will be better understood by referring to the upper right portion of FIG. 1 wherein there is shown a pipe vise and handle structure including a handle 13 pivoted to the frame 10 for swinging movement about a transverse pivot axis B parallel to and spaced above and forwardly of the transverse saw axis A as viewed in FIG. 1. This swinging movement is schematically depicted by the dashed line showing of the handle 13 at 13′.

The pipe vise portion of the structure takes the form of two pairs of vise jaws, one on each side of the plane of the circular saw blade 12 as will become clearer as the description proceeds. The one pair on the near side of the saw blade 12 as viewed in FIG. 1 includes a lower jar 14 pivoted at 15 to the lower end of the handle 13 and an upper jaw 16 rigidly secured to the handle 13 in juxtaposed relationship to the movable lower jaw 14. A finger gripping lever 17, in turn, is positioned beneath the handle 13 and pivoted thereto such that the same can be manually squeezed by an operator holding the handle 13. Squeezing or upward movement of the lever 17 will serve to close the lower jaw 14 against the upper jaw 16 to tightly grip a pipe therebetween. This action is accomplished by a coupling link 18 connected between the lever 17 and the extreme end of the jaw 14 as illustrated in FIG. 1. Further details of this operation will become apparent as the description proceeds. However, the parts as depicted in solid lines in FIG. 1 correspond to the position of the handle and vise jaws when a pipe has been cut completely through 100% by the circular saw blade 12. In this respect, there is provided a rear stop 19 on the extreme right hand end of the frame 10 for preventing further swinging movement of the handle 13 about the pivot point beyond that necessary to assure that the pipe is cut completely through. The stop 19 thus protects the lever mechanism and the link 18 as well as the support for the upper jaw 16 from the saw blade 12.

Referring now to the forward or left portion of the frame 10 as shown in FIG. 1, there is indicated at 20 and 21 means in the frame connected to the motor for cleaning the outside surfaces of cut copper pipe and also reaming and deburring the pipe ends after cutting by the saw blade 12. As will become clearer as the description proceeds, the means 20 and 21 take the form of sockets having internal wire brushes directed radially inwardly for engaging about the outside surface of the pipe. The cleaning and deburring operation constitutes a step in preparation of soldering the pipe. Two different sized pipes may be cleaned by the respective components 20 and 21. However, as will also become clearer as the description proceeds, these components can be changed to yet other sizes for cleaning still other sized pipes.

Referring now to the upper portion of the frame 10, there is indicated at 22 a flux or solder paste cartridge which can be inserted in the frame 10 to connect to appropriate internal flux guide passages terminating in flux applicator heads indicated at 23 and 24. Control of flux or paste flow to these heads can be accomplished by appropriately operated push button valves schematically indicated at 25 and 26. Thus, after a pipe end has been cleaned, it can be inserted into one or the other of the components 23 or 24 depending upon the diameter of the pipe and flux or soldering paste uniformly applied to its outer surface.

Finally, there is shown in FIG. 1 a well 27 serving to hold a touch-up brush 28 shown exxploded above the well. Thus, in a soldering operation, the brush 28 will come in handy to apply flux to fixed pipes not always accessible to the applicator heads as well as to touch-up various places that might have been missed by the applicator heads. A carrying handle 29 is shown secured to the upper forward portion of the frame and extending in a transverse plane; that is, into and out of the plane of the drawing, for convenient gripping by an operator while swinging the pipe vise and handle structure with his other hand in carrying out a saw cut.

Figure 2:
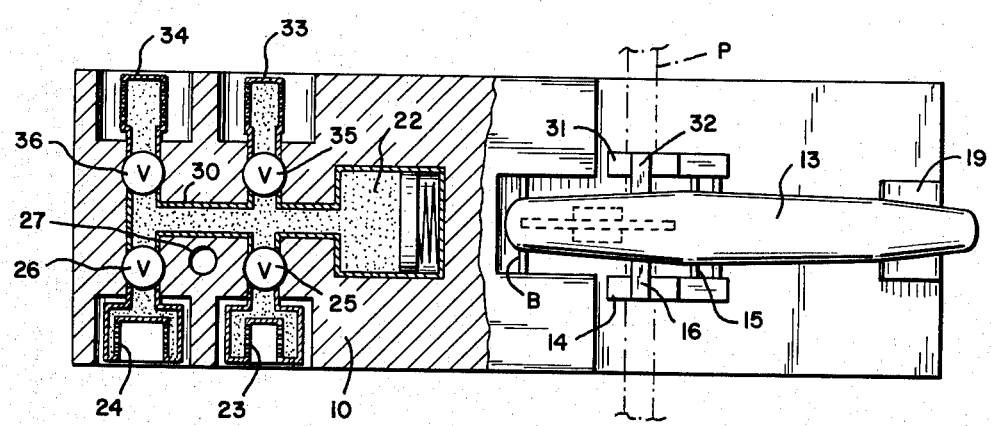
FIG. 2 is a top plan view partly in cross section taken along the section line 2—2 of FIG. 1.

All of the foregoing can now be better understood by referring to the plan view partially in cross section of FIG. 2, wherein the flux cartridge 22 described in FIG. 1 is shown as a reservoir for flux or paste under pressure as applied by an appropriate piston and spring. An appropriate flux guiding passage indicated at 30 brings the flux into communication with the various valves such as 25 and 26 for the flux applicator heads 23 and 24 so that when these valves are depressed as described in FIG. 1, flux under pressure will be supplied to the applicator heads.

Referring to the right-hand portion of FIG. 2, the second pair of jaws making up the pipe vise briefly described in FIG. 1 on the other side of the saw blade 12 are indicated at 31 and 32. Also there is shown depicted by phantom lines a copper pipe P held in the respective pairs of vise jaws 14, 16 and 31, 32.

Referring once again to the left or forward portion of the frame 10 as shown in FIG. 2, additional flux applicator heads are illustrated at 33 and 34 designed to uniformly apply flux to the inside surface of a fitting. The different diameter applicator heads are provided to accommodate different inside diameter fittings. To control the flow of flux to these heads, there are provided additional push-button valves schematically indicated at 35 and 36.

Figure 3:
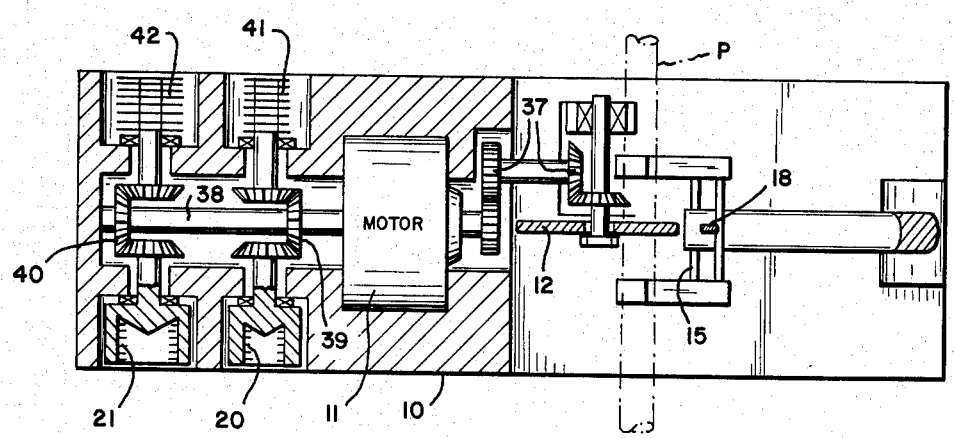
FIG. 3 is a plan cross section taken along the section line 3—3 of FIG. 1.

Referring now to the cross section of FIG. 3, one type of gear train for coupling the high speed motor 11 to the circular saw blade 12 is schematically indicated at 37.

Referring to the left portion of FIG. 3, the motor 11 is also indicated as driving a shaft 38 to transmit power through appropriate bevel gears 39 and 40 to the wire brush cleaning heads 20 and 21 described in FIG. 1. The wire brushes extend radially inwardly in the socket-like structures as shown for cleaning the outer cut ends of a pipe as described.

Also powered from the same shaft 38 are additional wire brush cleaning structures 41 and 42 on the opposite side of the frame 10. These wire brush cleaners are designed to be received in the inner ends of a fitting to clean the same preparatory to being soldered to a cut pipe end. Since the wire brushes need only rotate at a fraction of the speed of the circular saw blade 12, the motor 11 may constitute a two-speed motor so that a lower speed can be selected for operation of the wire brushes. Alternatively, an appropriate gear system could be utilized between the motor and the wire brushes to reduce their rotational speed.

Referring now to FIGS. 4 through 8, further details of various components described heretofore will become evident.

Figure 4:
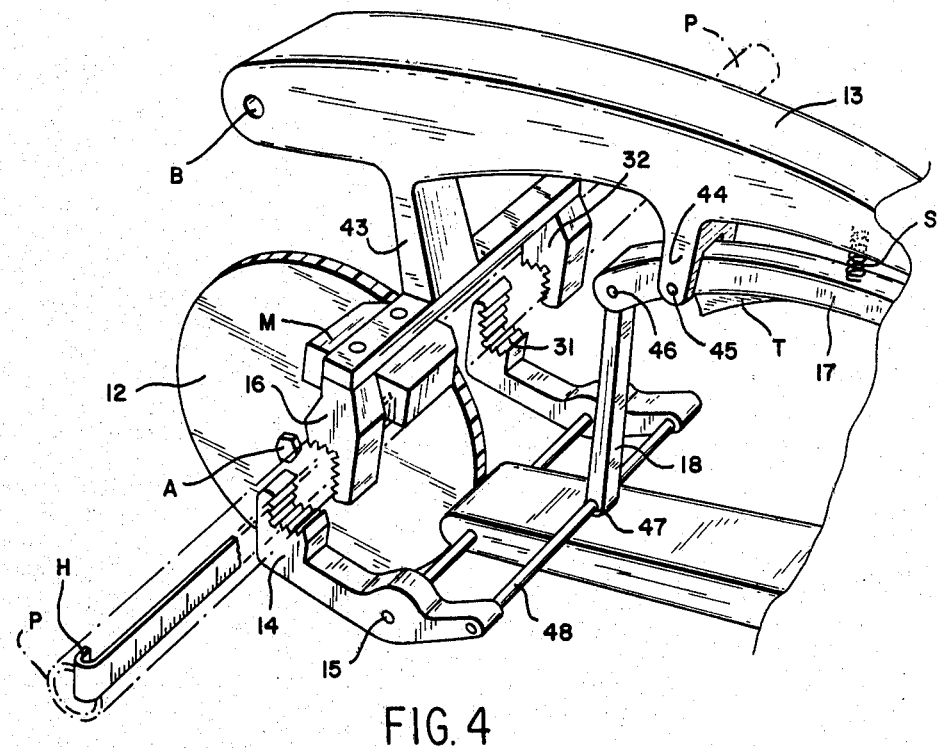
FIG. 4 is an enlarged fragmentary perspective view of the cutting saw and pipe vise and handle structure portion of the tool of FIG. 1 useful in explaining further details of its operation.

Considering first FIG. 4, there is indicated at 43 the integral connection from the handle 13 to the upper jaw members 16 and 32. Similarly, there is shown at 44 the support to the handle of the finger gripping lever 17, the same being pivoted to the support 44 at 45. The forward end of this lever 17 in turn is pivoted to the link 18 at 46. The lower end of the link 18 in turn is pivoted at 47 to cross bar 48 connecting to the ends of the lower jaws 14 and 31 as shown.

From the foregoing described coupling, it will be evident that when the finger-engaging lever 17 is squeezed upwardly against the handle 13 so as to cause a slight rotation about the pivot 45 in a counter-clockwise direction, the link member 18 will be moved downwardly to thereby rock the lower jaw members 14 and 31 upwardly about the pivot 15 and thereby engage the pipe P in a tight grip. When the operator relaxes the squeezing pressure on the lever 17, the lower jaws 14 and 31 are free to fall away from the upper jaws 16 and 32 and thereby release the pipe. A small coiled spring S may be provided on the underside of the handle 13 to provide a light bias force on the lever 17 in opposition to the squeezing force so that relaxing of the gripping of the lever will permit the jaws to come apart by action of the spring S.

A further feature of this invention is illustrated in FIG. 4 in the form of a tape measure M secured to the pipe vise and handle structure in a position such that the tape itself can be withdrawn to measure the length of the pipe P. The end of the tape terminates in a hook H for securement to the end of the pipe and the tape is marked with a scale facing the operator starting at the plane of the saw blade 12. If desired, the measure M can be secured on the opposite side of the support 43 and extend out to the right, the scale being printed on both the top and bottom edges of the tape.

Figure 5:
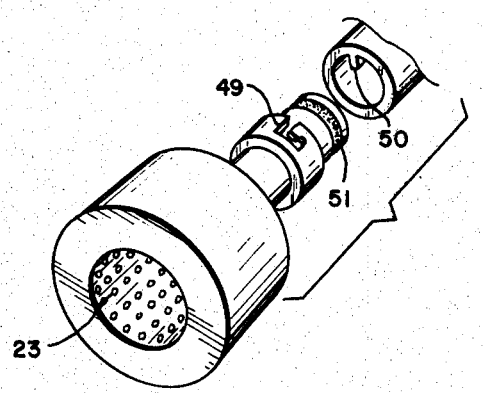
FIG. 5 is an exploded fragmentary perspective view of a flux applicator head constituting another portion of the tool of FIG. 1 for applying soldering flux to the outside surface of a cut pipe end.

FIG. 5 shows in enlarged perspective view the flux applicator head 23 described in FIGS. 1 and 2. It will be noted that the same is provided with a bayonnet type slot 49 for coupling to the flux delivery tube, this delivery tube in turn being provided with a small pin 50 receivable in the bayonnet slot 49. An O-ring 51 may be provided about the tube adjacent to the bayonnet slot 49 to provide a proper seal. By such an arrangement, different sized applicator heads can be substituted for the applicator head 23 if neither of the applicator head sizes 23 and 24 will function for a particular pipe.

In FIG. 5, the internal openings of the socket portion cause the flux paste to cover the outer surface of a cleaned pipe end inserted therein over 360°, the flux being under pressure so that it is only necessary to open the corresponding valve for the applicator head 23. In the description of FIGS. 1 and 2, this particular valve is designated 25.

Figure 6:
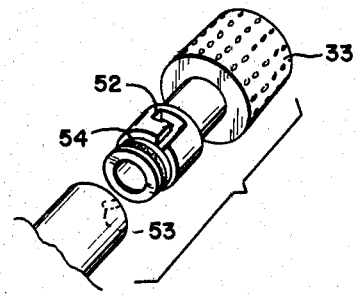
FIG. 6 is a view similar to FIG. 5 showing another flux applicator head utilized in the tool of FIG. 1 for applying flux to the inside surface of a pipe fitting.

FIG. 6 is another fragmentary perspective view of the applicator head 33 on the opposite side of the frame 10 described in conjunction with FIG. 2 wherein there are provided a series of holes on the outer surface of a cylindrical probe, which can be inserted inside a fitting to provide a flux coating on the interior surface of the fitting preparatory to soldering the same to a pipe end. As in the case of the applicator head of FIG. 5, there is provided a bayonnet slot 52 for cooperation with a pin 53 in the flux flow passage so as to enable interchanging of the head with others of different sizes. Also there is provided an O-ring 54 to provide a proper seal.

Figure 7:
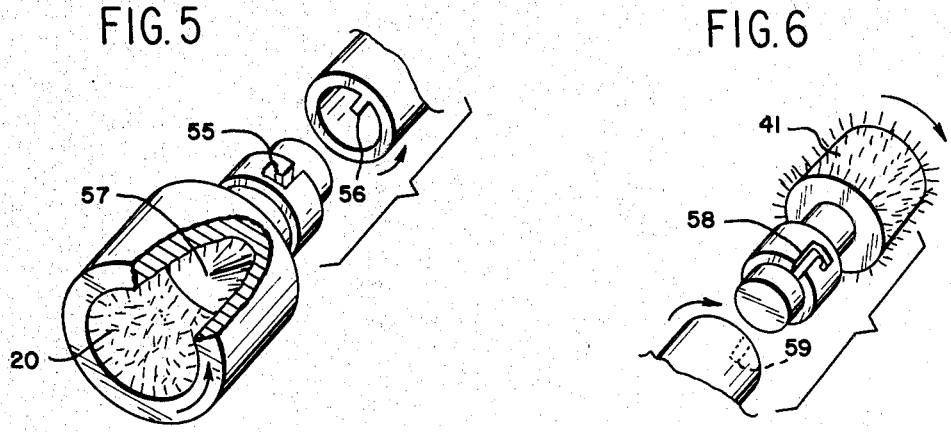
FIG. 7 is an exploded perspective view of a wire cleaning tool constituting still another portion of the tool of FIG. 1 for cleaning the outside surface of a cut pipe end and deburring and reaming the same; and, FIG. 8 is a view similar to FIG. 7 showing a wire cleaning brush constituting a component of the structure of FIG. 1 for cleaning the inside surface of a fitting.
Figure 8:
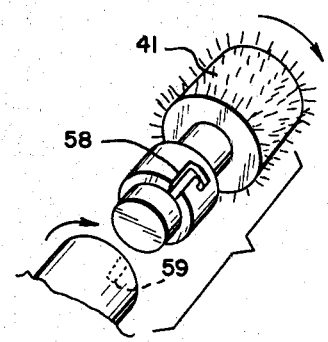

FIGS. 7 and 8 are fragmentary perspective views of the wire brushes for cleaning and in the case of the brush of FIG. 7 for deburring and reaming a cut pipe end. In FIG. 7 the particular wire brush illustrated is 20, the same as described in FIGS. 1 and 3 wherein there are provided radially inwardly extending wires for engaging the outer surface of a pipe over 360° to clean the same upon rapid rotation of the wire brush fixture. A bayonnet slot 55 and pin 56 may be provided between the member and shaft to drive the same so that the fixture can be interchanged with others of different sizes. If the rotation of the shaft containing the pin 56 is as indicated by the arrow, then the bayonnet slot 55 is oriented as shown so that frictional drag on the member 20 will tend to always move the pin further into the slot. A quick disconnect is thus provided with assurance that the fixture will remain properly connected during rotation.

In the broken away portion of FIG. 7, there is illustrated the reaming portion of the tool at 57, the same taking the form of a conical base formed on the floor of the fixture.

FIG. 8 illustrates the wire brush for cleaning the inside of a fitting preparatory to receiving a solder flux for soldering to the end of a pipe. Towards this end, there is provided a cylinder with radially outwardly extending wires as indicated at 41 corresponding to the structure 41 shown in FIG. 3. Again, a bayonnet slot 58 and pin 59 in the driving shaft are provided to rotate the brush and provide for a quick connect and disconnect feature.

It will be understood that the various couplings and connections as illustrated in FIGS. 1 through 8 for the plumbing tool are merely exemplary and equivalent means can be employed.

OPERATION

In operation, a plumber can easily carry the multipurpose plumbing tool by means of the handle 29 shown in FIG. 1. When it is necessary to cut a copper pipe of a given length, the plumber need only insert the pipe in the jaws described in FIG. 4 and use the rule M to measure off the precise length. The pipe can then be gripped tightly by the jaws by the plumber simply tightening his grip on the lever 17 beneath the handle 13. The operator can then start the motor as by means of an appropriate trigger means such as the trigger T illustrated in FIGS. 1 and 4, conveniently positioned under the lever 17. The operator will then swing the entire pipe vise and handle structure downwardly about the pivot axis B to cause the pipe portion held between the pairs of vises to engage the periphery of the rotary saw 12. Further downward swinging movement of the handle 13 will move the pipe further radially inwardly of the saw and cause a clean cut to be effected.

As mentioned briefly heretofore, since there are provided two pairs of vises on either side of the plane of the saw, the cut portions are both gripped so that there is no possibility of a piece of cut pipe falling off of the frame or out of control of the user. This feature is important where a worker might be on a high scaffolding.

After the pipe is cut, the same can be reamed and deburred by selecting the appropriately sized wire brush structure 20 or 21 shown in FIG. 1 and described in detail in FIG. 7. With the outside of the pipe cleaned, a fitting can similarly be cleaned as by means of the wire brush on the opposite side of the tool described in FIG. 8.

Thereafter, solder flux can readily be applied to the exterior of the pipe by the flux applicator head 23 or 24 depending upon the pipe size and the fitting similarly lined with flux on its interior by one or the other of the applicator heads 33 and 34 shown in FIG. 2. As described, the operator need only depress one of the valve buttons to cause the flux paste to be extruded.

The operator can then carry on a soldering operation. Any places where flux should be applied such as already installed pipe ends can be treated by using the flux brush 28 described in FIG. 1. This brush can also be used to touch up places where the applicator heads might have missed as also described heretofore.

While the trigger T has been described as located on the squeeze lever 17 thereby permitting one hand operation of the saw, it can advantageously be located on the handle 29 for operation by the plumber's other hand when steadying the saw. It should also be understood that the stop 19 for the handle 13 shown in FIG. 1 is preferably provided with a clip or other means for holding the handle secure when the tool is not in use. Finally, the tool can be mounted on a stand or equivalent supporting frame for ease of operation.

From all of the foregoing, it will now be evident that the present invention provides a tool wherein copper plumbing pipe can be cut, soldered and assembled in a substantially shorter length of time than was possible heretofore when several different tools were required to properly treat the copper piping.

Various changes falling within the scope and spirit of this invention will occur to those skilled in the art. The multi-purpose tool is therefore not to be thought of as limited to the exact embodiment set forth merely for illustrative purposes.

I claim:

1. A multi-purpose plumbing tool including, in combination:
    (a) an elongated portable frame;
    (b) a high speed motor;
    (c) a circular pipe saw coupled to said motor for high speed rotation about a transverse saw axis when said motor is started;
    (d) a pipe vise including two pairs of jaws, one on either side of the plane of said circular saw; and
    (e) pivot means on said frame at a point spaced from the pipe vise for enabling relative swinging movement to take place between said circular pipe saw and said pipe vise about a transverse pivot axis parallel to and spaced from said transverse saw axis, whereby a pipe can be gripped by said pipe vise and engaged by the periphery of said saw so that further relative swinging movement about said pivot axis will cause cutting of the pipe by the saw, the pipe being held on either side of the cut made by the saw by the respective pairs of jaws as the cut progresses.

2. A tool according to claim 1, in which said high speed motor and circular saw are carried on said frame and said pipe vise is carried on said pivot means for movement towards and away from said saw blade, said pipe vise including a handle; a finger engaging lever beneath the handle and pivoted to the handle for upward squeezing motion by an operator holding the handle; and linkage means between said lever and pipe vise for opening and closing the vise in response to relaxing and squeezing force on the handle and lever so that a pipe can be held in the vise by the operator while the operator is holding the handle to swing the handle and vise structure and pipe held therein into cutting relationship with the saw.

3. A tool according to claim 1, including power means in said frame for cleaning the outside surfaces of pipe ends cut by said saw and for reaming and deburring the said pipe ends.

4. A tool according to claim 3, including power means in said frame for cleaning inside surfaces of pipe fittings to be soldered to pipe ends cut by said saw.

5. A tool according to claim 4, including means in said frame for holding a cartridge of solder flux; and means in said frame for guiding and dispensing said solder flux over 360° of the outside surface of a cleaned pipe end and onto the inside surface of a pipe fitting for preparing the same for soldering.

6. A tool according to claim 1, including a well formed in said frame for holding a flux touch-up brush.

7. A tool according to claim 3, in which said means is interchangeable for cleaning, reaming and deburring the outside surfaces of pipe ends of different diameters.

8. A tool according to claim 4, in which said means for cleaning inside surfaces of pipe fittings is interchangeable for cleaning the inside surface of pipe fittings of different inside diameters.

9. A tool according to claim 5, in which said means for dispensing solder flux takes the form of applicator heads for the outside and inside surfaces, said applicator heads being interchangeable with heads of different sizes for different sized pipes and fittings.

* * * * *